US00RE34963E

United States Patent [19]

Eungard

[11] E Patent Number: Re. 34,963

[45] Reissued Date of Patent: Jun. 13, 1995

[54] FRICTION CASTING FOR A BOLSTER POCKET

[75] Inventor: William C. Eungard, Plainfield, Ill.

[73] Assignee: Standard Car Truck Company, Park Ridge, Ill.

[21] Appl. No.: 237,145

[22] Filed: May 3, 1994

Related U.S. Patent Documents

Reissue of:

[64] Patent No.: 4,974,521
Issued: Dec. 4, 1990
Appl. No.: 208,596
Filed: Jun. 20, 1988

[51] Int. Cl.[6] ..... B60F 3/00
[52] U.S. Cl. ..... 105/198.4; 105/207
[58] Field of Search ..... 105/197.05, 198.2, 198.4, 105/198.5, 193, 207, 220

[56] References Cited

U.S. PATENT DOCUMENTS

| | | | |
|---|---|---|---|
| 2,702,512 | 2/1955 | Maatman | 105/207 |
| 4,167,907 | 9/1979 | Mulcahy et al. | 105/198.4 |
| 4,295,429 | 10/1981 | Wiebe | 105/198.4 |
| 4,333,404 | 6/1982 | Kleykamp | 105/207 |
| 4,426,934 | 1/1984 | Geyer | 105/198.4 |

*Primary Examiner*—Joseph Pape
*Attorney, Agent, or Firm*—Alfred D. Lobo

[57] ABSTRACT

A friction wedge for use in a railroad car truck bolster pocket which has a slanted rear wall and adjoining side walls perpendicular thereto, one surface thereof adapted to bear against a portion of a car truck side frame and a slanted surface and adjoining sides adapted to bear against the slanted rear wall and adjoining side walls of the bolster pocket. The friction wedge includes a metal body and a polymer cover providing the slanted surface and adjoining sides, with the polymer cover being formed in a plurality of sections movable relative to each other and the metal body such that, during use, the polymer sections may move into contact with the pocket rear wall and adjoining side walls.

8 Claims, 3 Drawing Sheets

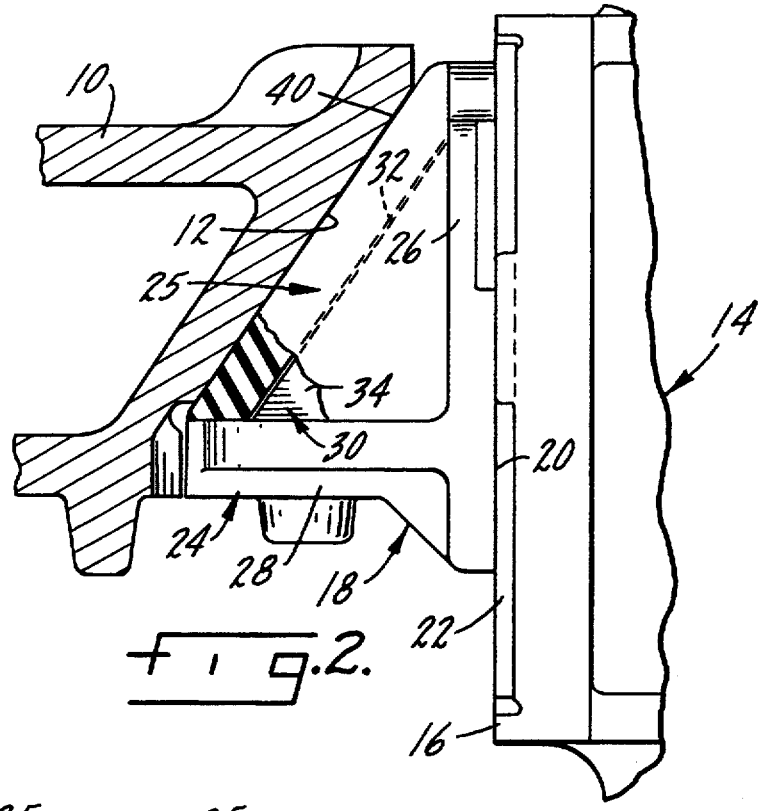
fig.2.
fig.1.
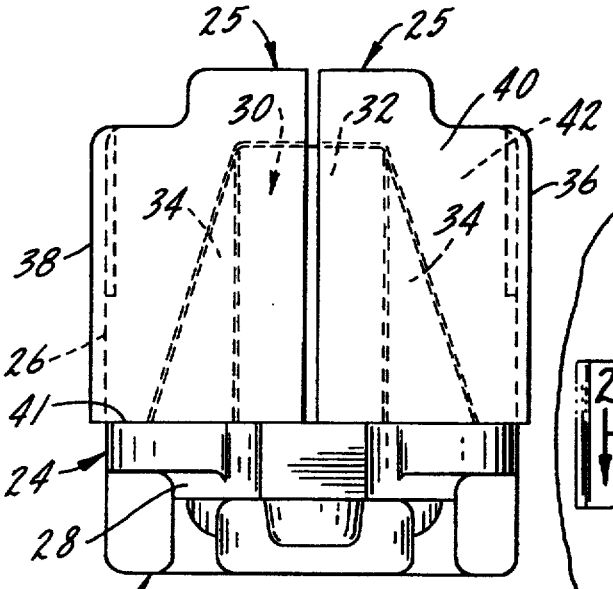
fig.3.
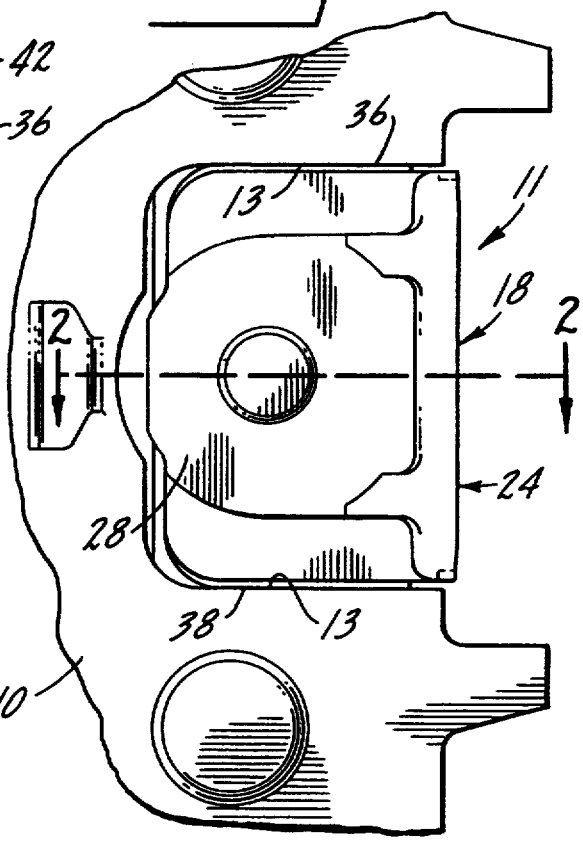

FRICTION CASTING FOR A BOLSTER POCKET

Matter enclosed in heavy brackets [ ] appears in the original patent but forms no part of this reissue specification; matter printed in italics indicates the additions made by reissue.

SUMMARY OF THE INVENTION

The present invention relates to friction wedges for use in the pocket of a railroad car truck bolster and in particular to such a friction wedge having a metal body and polymer cover for those surfaces engaging the bolster pocket.

Another purpose is a friction wedge of the type described in which a sectioned polymer cover comprises those portions of the friction wedge which are in contact with the bolster pocket, with the sections being self adjusting, during use, into full contact with the bolster pocket slanted rear wall and adjoining side walls.

Another purpose is a friction wedge of the type described in which the polymer cover is formed of a high density, linear polyethylene of very high molecular weight (UHMW polymer) having a very low static and kinematic coefficient of friction against a metal surface.

Another purpose is a friction wedge of the type described having a polymer cover to protect the slanted rear wall and side walls of the bolster pocket from wear.

Another purpose is a friction wedge of the type described utilizing a sectioned polymer cover which essentially prevents relative lateral movement between the friction wedge and the adjoining surfaces of the bolster pocket.

Other purposes will appear in the ensuing specification, drawings and claims.

BRIEF DESCRIPTION OF THE DRAWINGS

The invention is illustrated diagrammatically in the following drawings wherein:

FIG. 1 is a bottom plan view of a portion of a railroad car truck bolster and a friction wedge, FIG. 2 is a section taken substantially along plane 2—2 of FIG. 1, FIG. 3 is a left side view of the friction wedge of FIG. 2.

DESCRIPTION OF THE PREFERRED EMBODIMENT

Figure 4:
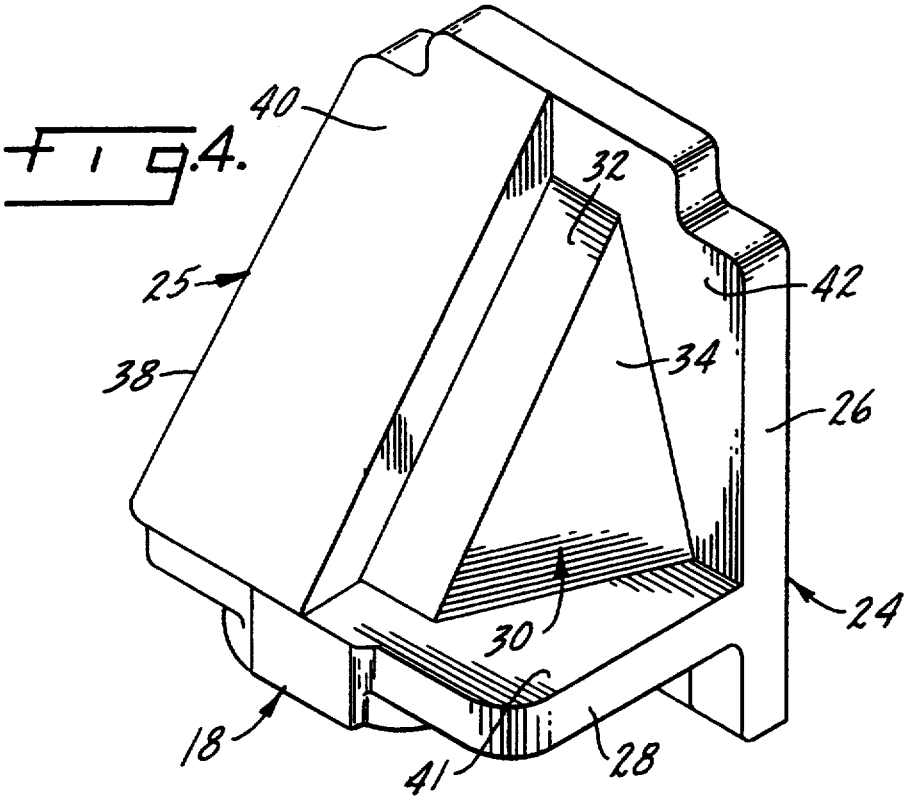
FIG. 4 is an isometric view of the friction wedge and one section of the polymer cover.

It has long been conventional in railroad car trucks to position a friction wedge in a bolster pocket to dampen movement between the bolster and the side frame. To prevent wear to the bolster pocket, which is conventionally formed of a relatively soft steel casting, it has been conventional to position a hardened steel wear plate along the slanted wall of the bolster pocket. A wear plate is also positioned on the vertical column of the side frame, with the dampening wedge being positioned between and bearing against both wear plates.

It has been noted, particularly in high mileage, high utilization railroad cars, such as those on unit coal trains, that there is substantial wear on the bolster pocket side walls, particularly the outboard side wall. Such wear on the bolster pocket may be due to the phenomenon known in the art as "hunting," to the rock and roll action of a freight car on rough track, and to the action of the truck passing through a switch wherein the bolster may move laterally relative to the side frames causing a wear and impact-type of reaction between the bolster pocket and the friction wedge positioned therein. The basic friction wedge as described herein has long been known in the art and in the last several years various attempts have been made to protect the bolster pocket from friction wedge wear, for example as illustrated in U.S. Pat. No. 4,426,934, assigned to the assignee of the present application and in U.S. Pat. No. Re. 31,988.

The present invention provides a protective cover for the friction wedge in the form of a UHMW polymer having a low coefficient of friction which eliminates the need for a bolster pocket wear plate and provides protection for both the slanted rear wall and side walls of the bolster pocket.

U.S. Pat. No. 3,851,595, also assigned to the assignee of the present application, illustrates the conventional railroad car truck side frame, the springs supporting the bolster within the side frame window and the friction wedge and its supporting spring. In the present application only the bolster, bolster pocket and a portion of the side frame column are illustrated along with the improved friction wedge which is the subject of the present application.

In FIG. 1, the bolster is indicated at 10 and the bolster pocket 11 has a slanted rear wall 12 and side walls 13. Facing bolster 10 is a side frame, indicated generally at 14, having a side frame column 16 which, along with the bolster pocket, confine a friction wedge indicated generally at 18.

Friction wedge 18, which will be formed of a conventional cast iron, has a generally vertical wear surface 20 which faces a side frame wear plate 22.

Friction wedge 18 is formed of a metal body 24 and a cover 25 formed of a UHMW polymer which has a very low coefficient of friction. Body 24 includes a vertical side frame wall 26 which faces side frame column 16 and a horizontal bottom 28 containing a spring seat which are integrally formed together with a wedge-shaped cover support 30. Cover support 30 has a rearwardly facing slanted surface 32 and triangular shaped surface 34 which join slanted surface 32, bottom 28 and side frame wall 26.

Cover 25 is preferably formed in a plurality of sections and, as shown herein, there are two such sections which are [symmetrical] *in mirror-image relationship with one another*. The sectioned cover includes sides 36 and 38 and a slanted surface 40 which, when the friction wedge is positioned within the bolster pocket, will bear against the rear slanted wall 12 of the bolster. The inside of cover 25 will have a configuration to match and conform to the cover support and particularly walls 32 and 34, as well as that portion 42 of side frame wall 26 and that portion 41 of the bottom 28 which forms a support for the cover. Thus, the interior of the cover and the exterior of the friction wedge metal body will conform so that together the elements provide the customary shape for a friction wedge and one which may be retrofitted into any current bolster pocket. The wedge-shaped support for the polymer cover will tend to force the two sections apart during use so that they will completely fill the bolster pocket and the sides 36 and 38 of the cover will bear against the side walls of the bolster pocket. In this way, the sectioned cover can accommodate the bolster pocket casting tolerances or any irregularities in the bolster pocket surfaces or any misalignment between the side frame column and the bolster. The cover will insure that the wedge is correctly positioned within the bolster pocket and in firm and complete contact with the side frame column, slanted rear wall of the bolster pocket and the side walls thereof. There will be little, if any, relative movement between the friction wedge and the bolster pocket and what movement between the friction wedge and the bolster pocket and what movement there is, since it is relatively free of friction because of the low coefficient of friction of the polymer cover, will cause no wear on the bolster pocket surfaces.

Although it is preferred that the polymer cover be sectioned, in some applications a single cover may be acceptable if it has a degree of flexibility such that it can conform to the shape of the bolster pocket once it is in use.

Figure 5:
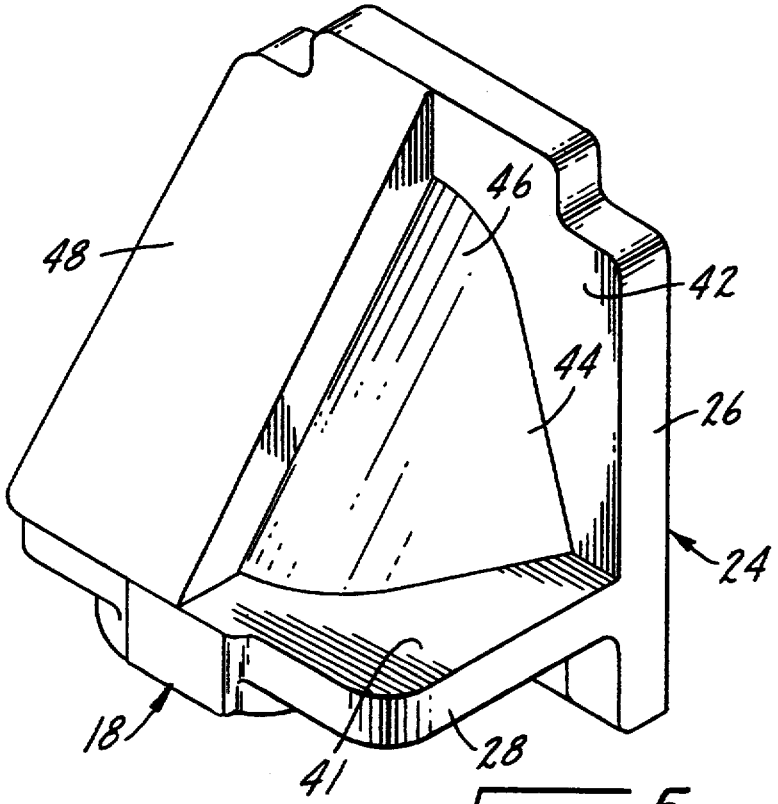
FIG. 5 is an isometric view, similar to FIG. 4, showing a modified form of the invention.

FIG. 5 illustrates a modified form of the invention in which the wedge shaped cover support has a curved profile 44 rather than flat sides as shown in FIGS. 1–4. Surface 44 will have a central tangent portion 46 which is generally parallel to and facing the slanted rear wall 12 of the bolster pocket. The interior of cover 48 will have a configuration to match and conform to the cover support.

Figure 6:
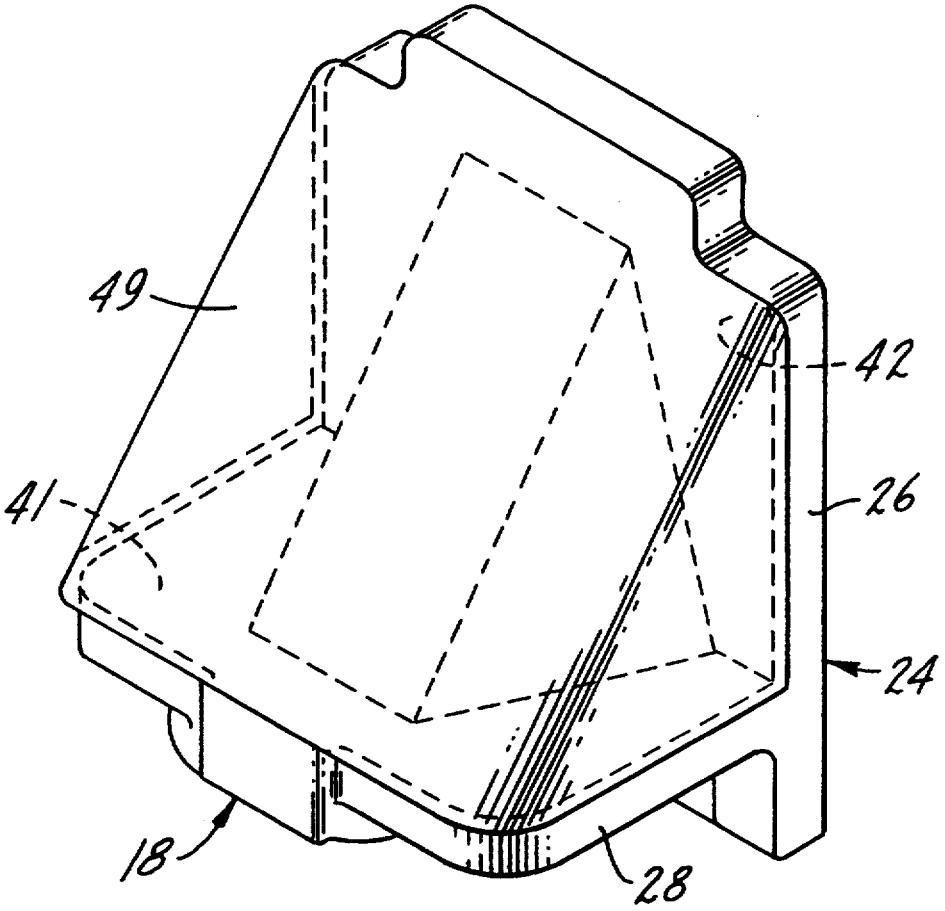
FIG. 6 is an isometric view of the friction wedge showing a singular polymer cover.

FIG. 6 illustrates another modified form of the invention in which a polymer cover 49 is a single element rather than the two symmetrical sections shown in FIGS.1–5. The inside of cover 49 will have a configuration to match and conform to the wedge support.

Whereas the preferred form of the invention has been shown and described herein, it should be realized that there may be many modification, substitutions and alterations thereto.

The embodiments of the invention in which an exclusive property or privilege is claimed are defined as follows:

1. A friction wedge for use in a railroad car truck bolster pocket having a slanted rear wall and adjoining side walls generally perpendicular thereto, said friction wedge, including a metal body and a polymer cover formed of [a material having a low coefficient of friction], *high density, ultra high molecular weight linear polyethylene*, the metal body having a surface thereof bearing against a portion of a car truck side frame, said polymer cover having a slanted surface and adjoining sides bearing against the slanted rear wall and adjoining side walls of the bolster pocket, said metal body having a sedge-shaped cover support which conforms to the interior of said polymer cover whereby said wedge-shaped cover support will cause said polymer cover to bear against the bolster pocket rear wall and adjoining side walls during use of the friction wedge.

2. The friction wedge of claim 1 further characterized in that said polymer cover is in a plurality of sections movable relative to each other and to the metal body such that during use said sections ay spread apart by the action of the wedge-shaped cover support to bear against the bolster pocket rear wall and adjoining side walls.

3. The friction wedge of claim 2 further characterized in that [there are two symmetrical polymer section] *said polymer cover is formed in two sections in mirror*-image relationship with one another.

4. The friction wedge of claim 1 further characterized in that said metal body includes a side frame wall, a bottom and a wedge-shaped cover support integral therewith.

5. The friction wedge of claim 4 further characterized in that said wedge-shaped cover support includes a slanted surface facing the bolster pocket slanted rear wall and triangular shaped surfaces joining said support slanted surface, side frame wall, and bottom of said metal body.

6. The friction wedge of claim 4 further characterized in that said wedge-shaped cover support has a slanted curved profile joining the side frame wall and bottom of the metal body.

7. The friction wedge of claim 6 further characterized in that said curved profile cover support has a tangent portion generally parallel to and facing the slanted rear wall of the bolster pocket.

8. The friction wedge of claim 4 further characterized in that said polymer cover is a single flexible element such that, during use, the cover may be spread by the wedge cover support so the cover may bear against the bolster pocket rear wall and adjoining side walls.

* * * * *